(No Model.)

C. SNYDER.
VEHICLE WHEEL.

No. 271,935. Patented Feb. 6, 1883.

Witnesses:
Saml. W. Langton
J. Nota McGill

Inventor:
Christian Snyder
By Myers & Co.
Attorneys

UNITED STATES PATENT OFFICE.

CHRISTIAN SNYDER, OF ELIZABETHVILLE, PENNSYLVANIA.

VEHICLE-WHEEL.

SPECIFICATION forming part of Letters Patent No. 271,935, dated February 6, 1883.

Application filed December 6, 1882. (No model.)

*To all whom it may concern:*

Be it known that I, CHRISTIAN SNYDER, a citizen of the United States of America, residing at Elizabethville, in the county of Dauphin and State of Pennsylvania, have invented certain new and useful Improvements in Vehicle-Wheels, of which the following is a specification, reference being had therein to the accompanying drawings.

My invention relates to an improvement in vehicle-wheels, the construction of which will be more fully pointed out in the specification and claims.

Figure 1:
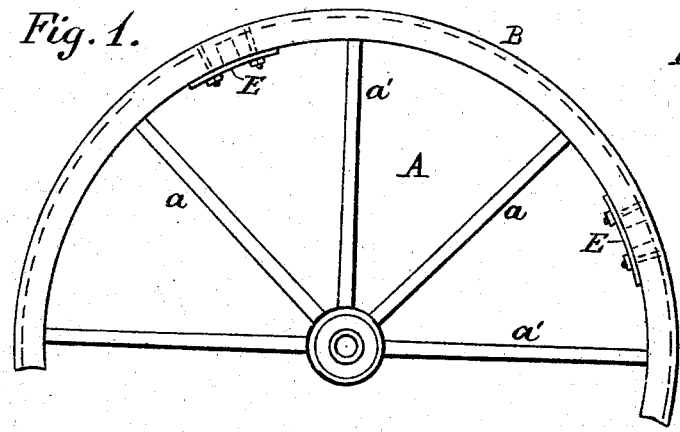
Figure 2:
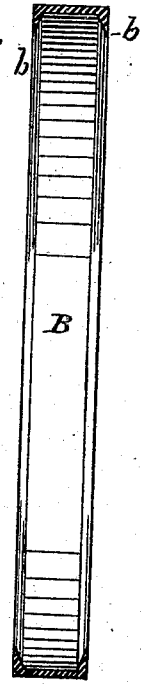
Figure 3:
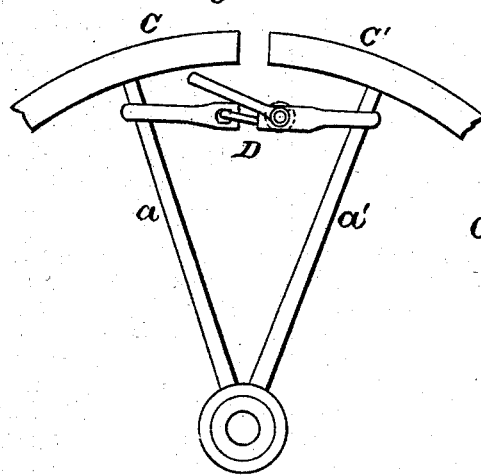
Figure 4:
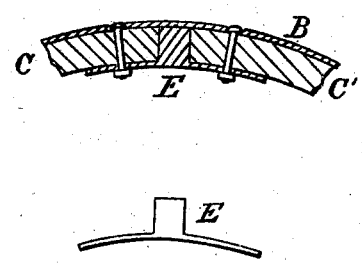

The object of my invention is to construct a vehicle-wheel that will be strong and durable, and of such a character that the fellies will not be liable to lateral displacement, nor will the wheel be liable to break by the sudden endwise movement of the axle while passing over rough and uneven ground, nor from any undue strain that may be put upon the wheel in use. I attain these objects by means of the following construction:

Figure 1 is a partial side view of a wheel having my improvement. Fig. 2 represents a cross-section of the tire. Fig. 3 represents a part of a wheel with a clamping device attached. Fig. 4 is a section showing expansion-wedge in place.

Like letters of reference indicate like parts on drawings.

A vehicle-wheel is first formed in the usual way without a tire, constructed of hub, spokes, and rim or fellies, and of the ordinary size for wagons and carriages. A tire is then formed, of the proper size to fit the wheel, with each edge flanged inward and extending the entire length of the inner surface of the same, each flange having a straight face or wall on its inner side, and adapted to fit tightly over and around the rim or fellies when shrunk onto its place. After the wheel A is formed in the usual manner the tire B is flanged and fitted to the exact size of the wheel A, a portion of each felly, C and C', is sawed out or cut off to shorten the same. Two or more clamps, D, are then applied to the opposite spokes, $a$ $a'$, between which a portion of the felly has been removed. Sufficient clamping force is then exerted to bring the ends of the fellies together and hold them in place. By this means the wheel A is contracted in its circumference and made smaller. This contraction is carried to the extent that with the expansion of the tire B by heat it can be readily slipped over the rim or fellies. The instant the tire B is slipped over the fellies and to its place, with the outer edge of the fellies just inside the inner edges of the flanges $b$ $b'$, the clamps D are instantly removed and the fellies immediately expanded into the space between flanges of the tire B while the tire is hot. An expansion-plug, E, is immediately inserted and the tire B cooled as rapidly as possible. When the tire B is thoroughly cooled the inner surface of the same fits tightly against the outside of the fellies of the wheel A, while the flanges $b$ $b'$ grip and bind tightly the sides of the same, thus holding them securely and forming, when complete, a very strong and durable vehicle-wheel. The expansion-wedge E is formed wedge-shaped with concave sides to receive the meeting ends of the fellies, and with a strap or plate on its inner end with perforations for bolts to pass through, the whole perferably being cast integral.

Having thus described my invention, what I claim, and desire to secure by Letters Patent, is—

A vehicle-wheel formed by removing a portion of the fellies of an ordinary wheel, contracting its size, expanding a flanged tire by heat, and passing it over the fellies while hot, immediately expanding the fellies to fit the entire space between the flanges of the tire, and inserting expansion wedges or plugs between the ends of the fellies, substantially as set forth.

In testimony whereof I affix my signature in presence of two witnesses.

CHRISTIAN SNYDER.

Witnesses:
S. E. BLYLER,
JAMES MILLER.